(12) United States Patent
Kim

(10) Patent No.: US 9,098,194 B2
(45) Date of Patent: Aug. 4, 2015

(54) KEYPAD OF MOBILE TERMINAL AND DISPLAY METHOD THEREOF

(75) Inventor: Han-Su Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 1302 days.

(21) Appl. No.: 12/414,501

(22) Filed: Mar. 30, 2009

(65) Prior Publication Data

US 2010/0001959 A1    Jan. 7, 2010

(30) Foreign Application Priority Data

Jul. 7, 2008   (KR) .................. 10-2008-0065665

(51) Int. Cl.
  *G06F 3/0488*   (2013.01)
  *H04M 1/23*   (2006.01)
  *H04M 1/725*   (2006.01)

(52) U.S. Cl.
  CPC ............. *G06F 3/04886* (2013.01); *H04M 1/23* (2013.01); *H04M 1/72522* (2013.01)

(58) Field of Classification Search
  CPC .. G06F 3/04886; G06F 3/0348; G06F 3/0219
  USPC ....................................................... 715/773
  See application file for complete search history.

(56) References Cited

U.S. PATENT DOCUMENTS

| 5,914,714 | A  | * | 6/1999  | Brown ........................ 715/866 |
| 2003/0154292 | A1 | * | 8/2003  | Spriestersbach et al. ..... 709/228 |
| 2004/0078445 | A1 | * | 4/2004  | Malik .......................... 709/206 |
| 2004/0212595 | A1 | * | 10/2004 | Zhou ........................... 345/168 |
| 2005/0184999 | A1 | * | 8/2005  | Daioku ........................ 345/589 |
| 2006/0282503 | A1 | * | 12/2006 | Gwozdz ...................... 709/206 |
| 2006/0290660 | A1 | * | 12/2006 | Kim ............................ 345/156 |
| 2008/0088590 | A1 | * | 4/2008  | Brown et al. ................ 345/168 |
| 2009/0177981 | A1 | * | 7/2009  | Christie et al. ............... 715/758 |

FOREIGN PATENT DOCUMENTS

| JP | 1995-160395 | 6/1995 |
| KR | 10-2006-0059312 | 6/2006 |

OTHER PUBLICATIONS

Korean Intellectual Property Office Application Serial No. 10-2008-0065665, Office Action dated Aug. 20, 2014, 4 pages.

* cited by examiner

*Primary Examiner* — Ajay Bhatia
*Assistant Examiner* — Phuong Nguyen
(74) *Attorney, Agent, or Firm* — Lee, Hong, Degerman, Kang & Waimey

(57)   ABSTRACT

A mobile terminal is provided. The mobile terminal includes a display and a controller. The controller is configured to display input characters and a cursor in a display window and to display a keypad in the display. The controller is further configured to display the keypad with a plurality of keys and to display the plurality of keys including display characters. The controller is further configured to change a font of the display characters corresponding to a font of an input character adjacent the cursor of the input characters.

8 Claims, 14 Drawing Sheets

KEYPAD OF MOBILE TERMINAL AND DISPLAY METHOD THEREOF

CROSS-REFERENCE TO RELATED APPLICATIONS

Pursuant to 35 U.S.C. §119(a), this application claims the benefit of earlier filing date and right of priority to Korean Application No. 10-2008-0065665, filed on Jul. 7, 2008, the contents of which are incorporated by reference herein in its entirety.

FIELD OF THE INVENTION

The present invention relates generally to mobile terminal, and more particularly, to a keypad of a mobile terminal and a display method thereof.

DESCRIPTION OF THE RELATED ART

A mobile terminal is a portable device having one or more functions of voice and video communications, inputting/outputting information, and storing data.

As mobile terminals have increasingly been implemented with various functions besides communication, such as capturing images and video via a camera, playing music files or video, playing games, and receiving broadcasts, the mobile terminals have been implemented in the form of comprehensive multimedia players.

Efforts are ongoing to support and increase the complicated functions of the multimedia players. Such efforts include a user interface (UI) and a virtual keypad allowing users to easily and conveniently search and select functions.

SUMMARY OF THE INVENTION

In an exemplary embodiment of the present invention, a mobile terminal and a keypad display method are provided. The mobile terminal includes a display and a controller. The controller is configured to display a display window and a keypad in the display, to display input characters and a cursor in the display window, to display the keypad with a plurality of keys, and to display the plurality of keys including display characters. The controller is further configured to change a font of the display characters corresponding to a font of an input character adjacent the cursor in the display window.

In one embodiment, said at least one of the display characters comprises all of the display characters.

In one embodiment, the controller is configured to change the font by changing the font type, style, size, or color.

In an exemplary embodiment of the present invention, a mobile terminal and another keypad display method are provided. The mobile terminal includes a display and a controller. The controller is configured to display a display window and a keypad in the display, to display the keypad including a plurality of keys, to display the plurality of keys including display characters, and to display the display characters in different user-selectable fonts in at least two of the plurality of keys. The controller is further configured to set a font of an input character, input by a user into the display window, by setting the font to the user-selectable font selected from one of the different user-selectable fonts in the at least two of the plurality of keys.

In one embodiment, the controller is further configured to display a user-selectable function key and to display the display characters in the different user-selectable fonts upon user selection of the user-selectable function key.

In one embodiment, the controller is further configured to display a user-selectable function key. In addition, the controller is configured to display a selection window for selecting font options upon user selection of the user-selectable function key. The font options include a font type option, a font size option, and a font color option. Furthermore, the controller is configured to display the display characters in the different user-selectable fonts upon user selection of the font options. The different user-selectable fonts are at least two font types if the font type option is selected in the font options, at least two font sizes if the font size option is selected in the font options, and at least two font colors if the font color option is selected in the font options.

In an exemplary embodiment of the present invention, a mobile terminal and yet another keypad display method are provided. The mobile terminal includes a display and a controller. The controller is configured to display a display window and a keypad in the display, to display input characters and a cursor in the display window, to display the keypad including a plurality of keys, and to display the plurality of keys including display characters. The controller is further configured to change a font of the display characters corresponding to a font of an input character adjacent the cursor in the display window, to display a user-selectable function key, and to display the display characters in different user-selectable fonts in at least two of the plurality of keys upon user selection of the user-selectable function key. The different user-selectable fonts are each in a different one of the at least two of the plurality of keys. The controller is further configured to set a font of an input character input at the cursor by setting the font to a user-selectable font upon being selected from one of the different user-selectable fonts.

In one embodiment, the controller is further configured to change the font of the display characters corresponding to the selected user-selectable font.

In an exemplary embodiment of the present invention, a mobile terminal and yet another keypad display method are provided. The mobile terminal includes a display and a controller. The controller is configured to display a display window and a keypad in the display, to display externally received data in the display window, and to display the keypad including a plurality of keys. The externally received data includes at least one user-selectable character. The controller is configured to display a user-selectable character in one of the plurality of keys upon the user-selectable character being selected from among the at least one user-selectable character in the display window.

In one embodiment, the at least one user-selectable character is a letter, number, punctuation, special character, symbol, image, emoticon, icon, hyperlink, avatar, or other graphical representation.

DETAILED DESCRIPTION

The mobile terminal according to exemplary embodiments of the present invention will now be described with reference to the accompanying drawings. In the following description, usage of suffixes such as "module," "part," or "unit" used for referring to elements is given merely to facilitate explanation of the present invention, without having any significant meaning by itself.

Figure 1:
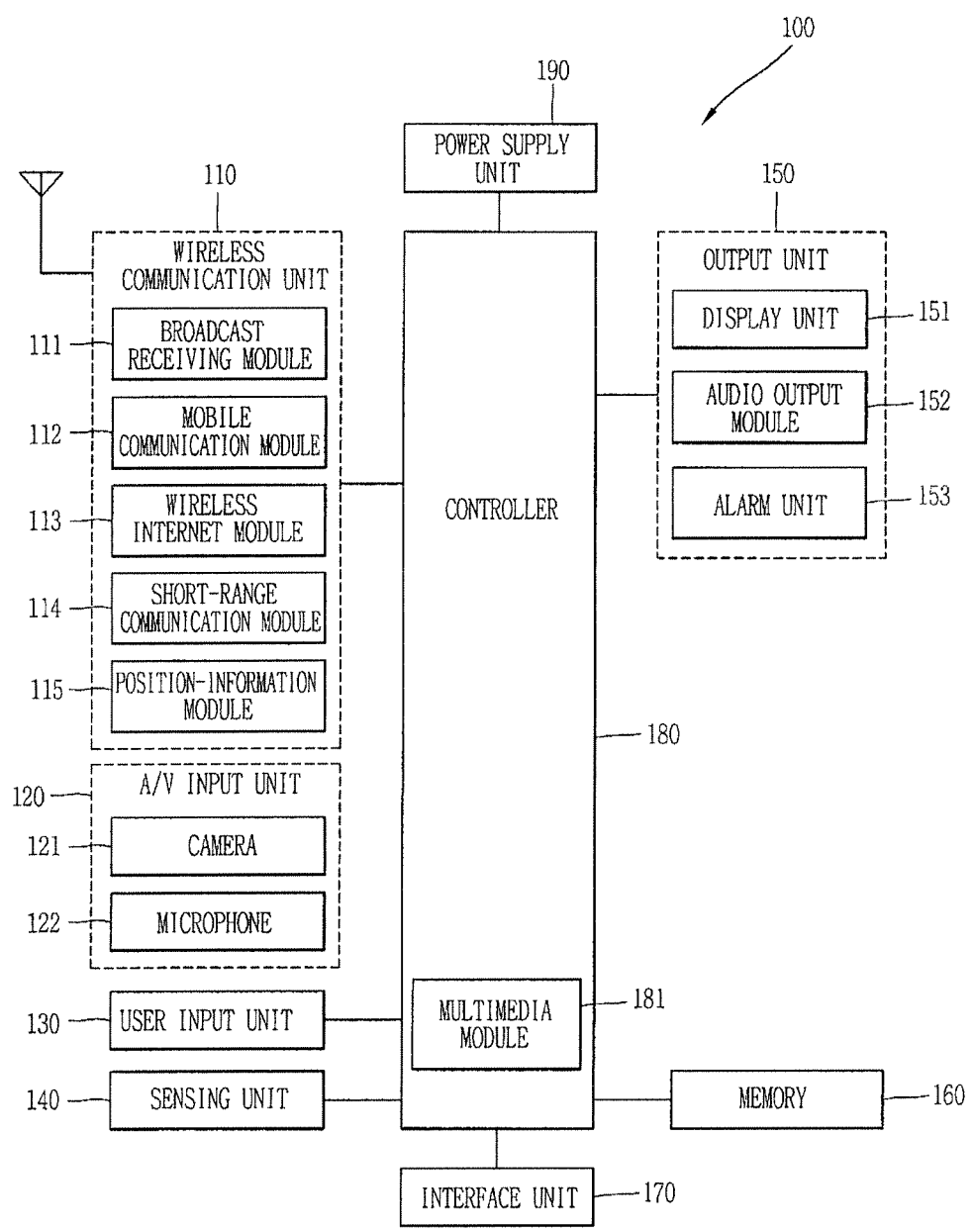
FIG. 1 is a schematic block diagram of a mobile terminal for implementing an embodiment of the present invention.

FIG. 1 is a block diagram of a mobile terminal 100 according to an embodiment of the present invention. Mobile terminals may be implemented in various forms such as mobile phones, smart phones, notebook computers, digital broadcast terminals, PDAs (personal digital assistants), PMPs (portable multimedia players), and navigation devices. However, except for the case where the configuration according to embodiments of the present invention is applicable only to mobile terminals, it would be understood by a person skilled in the art that embodiments of the present invention can also be applicable to the fixed terminals such as digital TVs and desktop computers. In the description below, it is assumed that the terminal is a mobile terminal. However, it would be understood by a person skilled in the art that the configuration according to the embodiments of the present invention can also be applicable to the fixed types of terminals, except for any elements especially configured for a mobile purpose.

The mobile terminal according to an embodiment of the present invention will now be described with reference to FIG. 1. The mobile terminal 100 may include a wireless communication unit 110, an A/V (audio/video) input unit 120, a user input unit 130, a sensing unit 140, an output unit 150, a memory 160, an interface unit 170, a controller 180, and a power supply unit 190. FIG. 1 shows a mobile terminal having various components. The components as shown in FIG. 1 are not a requirement, and greater or fewer components may alternatively be implemented.

The wireless communication unit 110 may include one or more components allowing radio communication between the mobile terminal 100 and a wireless communication system or a network in which the mobile terminal is located. For example, the wireless communication unit may include a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server via a broadcast channel. The broadcast channel may include a satellite channel and/or a terrestrial channel. The broadcast management server may refer to a server that generates and transmits a broadcast signal and/or broadcast associated information or a server that receives a previously generated broadcast signal and/or broadcast associated information and transmits the signal/information to a terminal. The broadcast signal may include not only a TV broadcast signal, a radio broadcast signal, and a data broadcast signal, but also a broadcast signal obtained by combining a data broadcast signal with the TV or radio broadcast signal.

The broadcast associated information may be information related to a broadcast channel, a broadcast program, or a broadcast service provider. The broadcast associated information may be provided via a mobile communication network. In this case, the broadcast associated information may be received by the mobile communication module 112.

The broadcast associated information may exist in various forms. For example, it may exist in the form of an electronic program guide (EPG) of digital multimedia broadcasting (DMB) or an electronic service guide (ESG) of digital video broadcast-handheld (DVB-H).

The broadcast receiving module 111 may receive digital broadcast signals by using digital broadcast systems such as multimedia broadcasting-terrestrial (DMB-T), digital multimedia broadcasting-satellite (DMB-S), media forward link only (MediaFLO®), digital video broadcast-handheld (DVB-H), or integrated services digital broadcast-terrestrial (ISDB-T). The broadcast receiving module 111 may be configured to be suitable for any other broadcast systems as well as the above-described digital broadcast systems. Broadcast signals and/or broadcast-associated information received via the broadcast receiving module 111 may be stored in the memory 160.

The mobile communication module 112 transmits and receives radio signals to and from at least one of a base station, an external terminal, or a server. Such radio signals may include a voice call signal, a video call signal or various types of data according to text/multimedia message transmission and reception.

The wireless Internet module 113 refers to a module for wireless Internet access. This module may be internally or externally coupled to the terminal. The wireless Internet technique may include a WLAN (Wireless LAN) (Wi-Fi), WiBro (Wireless broadband), WIMAX (World Interoperability for Microwave Access), or HSDPA (High Speed Downlink Packet Access).

The short-range communication-module 114 refers to a module for short-range communication. As the short range communication technologies, Bluetooth®, radio frequency identification (RFID), infrared data association (IrDA), ultra-wideband (UWB), or ZigBee® may be used.

The location information module 115 is a module for checking or acquiring a location of the mobile terminal. A GPS (Global Positioning System) module is a typical example of the location information module 115. The GPS module receives location information from a plurality of satellites. The location information may include coordinate information represented by latitude and longitude values. For example, the GPS module may measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites.

The A/V input unit 120 is configured to receive an audio or video signal. The A/V input unit 120 may include a camera 121 and a microphone 122. The camera 121 processes image frames of still pictures or video. The processed image frames may be displayed on a display unit 151.

The image frames processed by the camera 121 may be stored in the memory 160 or transmitted externally via the wireless communication unit 110. Two or more cameras 121 may be provided according to a usage environment.

The microphone 122 receives an external audio signal while in a phone call mode, a recording mode, and a voice recognition mode, and processes the audio signal into electrical audio data. The processed audio data may be converted for output into a format transmittable to a mobile communication base station via the mobile communication module 112 when in the phone call mode. The microphone 122 may include various types of noise canceling algorithms to cancel noise generated in the course of receiving and transmitting external audio signals.

The user input unit 130 generates input data to control an operation of the mobile terminal. The user input unit 130 may include a keypad, a dome switch, a touch pad (e.g., static pressure/capacitance), a jog wheel, and/or a jog switch.

The sensing unit 140 detects a current status of the mobile terminal 100 such as an opened or closed state of the mobile terminal 100, a location of the mobile terminal 100, a presence or absence of user contact with the mobile terminal 100, orientation of the mobile terminal 100, and an acceleration or deceleration movement of the mobile terminal 100. The sensing unit 140 generates a sensing signal for controlling the operation of the mobile terminal 100. For example, when the mobile terminal 100 is a slide type mobile phone, the sensing unit 140 may sense whether the slide phone is opened or closed. In addition, the sensing unit 140 can detect whether the power supply unit 190 supplies power or whether the interface unit 170 is coupled with an external device. The sensing unit 140 may include a proximity sensor. This will be described in relation to a touch screen.

The interface unit 170 serves as an interface by which at least one external device may be connected with the mobile terminal 100. For example, the external devices may include wired or wireless headset ports, external power supply (or battery charger) ports, wired or wireless data ports, memory card ports, ports for connecting a device having an identification module, audio input/output (I/O) ports, video I/O ports, or earphone ports.

The identification module may be a memory chip (or other element with memory or storage capabilities) that stores various information for authenticating a user's authority for using the mobile terminal 100 and may include a user identity module (UIM), a subscriber identity module (SIM), and/or a universal subscriber identity module (USIM). In addition, the device having the identification module (referred to as the "identifying device," hereinafter) may take the form of a smart card. Accordingly, the identifying device may be connected with the terminal 100 via a port or other connection means.

The interface unit 170 may be used to receive inputs (e.g., data, information, power) from an external device and transfer the received inputs to one or more elements within the mobile terminal 100 or may be used to transfer data between the mobile terminal and an external device.

In addition, when the mobile terminal 100 is connected with an external cradle, the interface unit 170 may serve as a conduit to allow power from the cradle to be supplied to the mobile terminal 100 or may serve as a conduit to allow various command signals input from the cradle to be transferred to the mobile terminal. Various command signals or power input from the cradle may operate as signals for allowing a user to recognize when the mobile terminal is properly mounted on the cradle.

The output unit 150 is configured to provide outputs in a visual, audible, and/or tactile manner such as an audio signal, a video signal, an alarm signal, and/or a vibration signal. The output unit 150 may include the display unit 151, an audio output module 152, an alarm unit 153, and a haptic module 154.

The display unit 151 may display information processed in the mobile terminal 100. For example, when the mobile terminal 100 is in a phone call mode, the display unit 151 may display a user interface (UI) or a graphical user interface (GUI) associated with a call or other communication such as text messaging or multimedia file downloading. When the mobile terminal 100 is in a video call mode or image capturing mode, the display unit 151 may display a captured image and/or received image, a UI, or GUI that shows videos or images and functions related thereto.

When the display unit 151 and the touch pad are overlaid in a layered manner to form a touch screen, the display unit 151 may function as both an input device and an output device. The display unit 151 may include at least one of a Liquid Crystal Display (LCD), a Thin Film Transistor-LCD (TFT-LCD), an Organic Light Emitting Diode (OLED) display, a flexible display, or a three-dimensional (3D) display. The display unit 151 may be configured to be transparent to allow viewing of the exterior. Such a display would be called a transparent display. A typical transparent display may be, for example, a TOLED (Transparent Organic Light Emitting Diode) display. The mobile terminal 100 may include two or more display units (or other display means) according to its particular desired embodiment. For example, the mobile terminal may include both an external display unit and an internal display unit.

The touch screen may be configured to detect the pressure when a touch is applied. The touch screen may also be configured to detect a touched position or area. A proximity sensor may be disposed within the mobile terminal covered by the touch screen or near the touch screen. The proximity sensor refers to a sensor for detecting the presence or absence of an object that accesses a certain detect surface or an object that exists nearby by using the force of electromagnetism or infrared rays without a mechanical contact. Thus, the proximity sensor has a longer life span compared with a contact type sensor and can be utilized for various purposes.

The proximity sensor may be a transmission type photo sensor, a direct reflection type photo sensor, a mirror-reflection type photo sensor, an RF oscillation type proximity sensor, a capacitance type proximity sensor, a magnetic proximity sensor, or an infrared proximity sensor.

An example of the operational principle of the RF oscillation type proximity sensor among the proximity sensors will now be described. When an object approaches the vicinity of a sensor detection surface in a state that an oscillation circuit oscillates a full wave RF, the oscillation amplitude of the oscillation circuit is attenuated or stopped, and such a change is converted into an electrical signal to detect the presence or absence of the object. Thus, when a non-metallic material comes between the RF oscillation proximity sensor and the object, the proximity sensor can detect the object desired to be detected without any interference by the object.

When the touch screen is an electrostatic type touch screen, an approach of the pointer is detected based on a change in an electric field according to the approach of the pointer. Although the pointer is not actually brought into contact with the touch screen but merely positioned close to the touch screen, the position of the pointer and the distance between the pointer and the touch screen can be detected. In the following description, for the sake of brevity, recognition of the pointer positioned to be close to the touch screen will be called a "proximity touch," while recognition of actual contact of the pointer on the touch screen will be called a "contact touch." When the pointer is in the state of the proximity touch, the pointer is positioned to correspond vertically to the touch screen.

The proximity sensor may detect a proximity touch and a proximity touch pattern such as a proximity touch distance, a proximity touch speed, a proximity touch time, a proximity touch position, and/or a proximity touch movement state, and output information corresponding to the detected proximity touch operation and the proximity touch pattern to the touch screen.

The audio output module 152 may output audio data received from the wireless communication unit 110 or stored in the memory 160 in a call signal reception mode, a call mode, a record mode, a voice recognition mode, and a broadcast reception mode. The audio output module 152 may provide audible outputs related to a particular function, such as a call signal reception sound and a message reception sound, performed in the mobile terminal 100. The audio output module 152 may include a receiver, a speaker, and/or a buzzer.

The alarm unit 153 may provide an output to inform about the occurrence of an event in the mobile terminal 100. Typical events may include call reception, message reception, key signal inputs, and a touch input. In addition to audio or video output, the alarm unit 153 may provide output in a different manner to inform about the occurrence of an event. For example, the alarm unit 153 may provide an output in the form of vibrations. When a call or a message is received, the alarm unit 153 may output vibrations. Through such vibration output, the user can recognize the occurrence of various events. Signal outputs informing about the occurrence of an event may be also provided via the display unit 151 or the audio output module 152.

The memory 160 may store software programs used for the processing and controlling operations performed by the controller 180, or may temporarily store data, such as a phonebook, messages, still images, and video, that are inputted or outputted. In addition, the memory 160 may store data regarding various patterns of vibrations and audio signals output when a touch is inputted to the touch screen.

The memory 160 may include at least one type of storage medium including a Flash memory, a hard disk, a multimedia card micro type, a card-type memory (e.g., SD or DX memory), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. The mobile terminal 100 may be operated in relation to a web storage device that performs the storage function of the memory 160 over the Internet.

The controller 180 typically controls the general operations of the mobile terminal. For example, the controller 180 performs controlling and processing associated with voice calls, data communications, and video calls. The controller 180 may include a multimedia module 181 for reproducing multimedia data. The multimedia module 181 may be configured within the controller 180 or may be configured to be separate from the controller 180. The controller 180 may perform a pattern recognition processing to recognize a handwriting input or a picture drawing input performed on the touch screen as characters or images, respectively.

The power supply unit 190 receives external power or internal-power and supplies appropriate power required for operating respective elements and components under the control of the controller 180.

Various embodiments described herein may be implemented in a computer-readable or its similar medium using, for example, software, hardware, or any combination thereof. For a hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform the functions described herein. In some cases, such embodiments may be implemented in the controller 180.

For a software implementation, the embodiments such as procedures or functions may be implemented together with separate software modules that allow performing of at least one function or operation. Software codes can be implemented by a software application (or program) written in any suitable programming language. The software codes may be stored in the memory 160 and executed by the controller 180.

Hereinafter, external elements of the mobile terminal will be described from the perspective of their functions with reference to FIG. 2 and FIG. 3. In the following description, among various types of mobile terminals such as folder type mobile terminals, bar type mobile terminals, swing type mobile terminals, and slide type mobile terminals, bar type mobile terminals will be described with respect to the exemplary embodiments of the present invention. However, the exemplary embodiments of the present invention are also applicable to any of the other types of mobile terminals.

Figure 2:
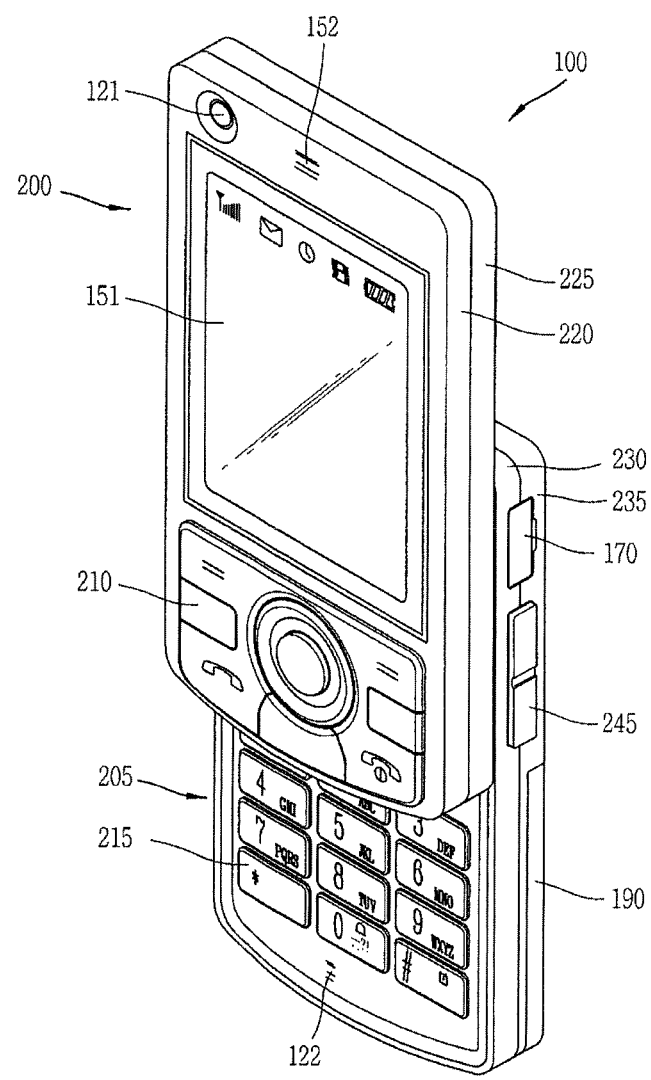
FIG. 2 is a front perspective view of a mobile terminal for implementing an embodiment of the present invention.

FIG. 2 is a front perspective view of the mobile terminal 100 according to an embodiment of the present invention. The mobile terminal 100 includes a first body 200 and a second body 205 that can be slidably moved along at least one direction with respect to the first body 200. In case of a folder type mobile phone, the mobile terminal 100 may include a first body and a second body having at least one side that can be folded or unfolded with respect to the first body.

A state in which the first body 200 is disposed to overlap with the second body 205 may be called a closed configuration, and as shown in FIG. 2, a state in which at least a portion of the second body 205 is exposed may be called an open configuration.

In an exemplary embodiment, the mobile terminal 100 may be the folder type mobile terminal including the first body and the second body having at least one side to be folded or unfolded with respect to the first body. A state in which the second body is folded may be called a closed configuration, and a state in which the second body is unfolded may be called an open configuration.

In another exemplary embodiment, the mobile terminal may be a swing type mobile terminal including a first body and a second body configured to be swingable with respect to the first body. A state in which the first body is disposed to overlap with the second body may be called a closed configuration, and a state in which the second body is swung to expose a portion of the first body may be called an open configuration.

In the closed configuration, the mobile terminal mainly operates in a standby (or idle) mode, and the standby mode may be released upon user manipulation. The mobile terminal operates mainly in the calling mode in the open configuration.

In the open configuration, the mode can change to the standby mode with the lapse of time or upon user manipulation.

The case (or casing, housing, cover) constituting the external appearance of the first body 200 may include a first front case 220 and a first rear case 225. Various electronic components are installed in the space between the first front case 220 and the first rear case 225. One or more intermediate cases may be additionally disposed between the first front case 220 and the first rear case 225. The cases may be formed by injection-molding a synthetic resin or may be made of a metallic material such as stainless steel (STS) or titanium (Ti).

The display unit 151, the audio output module 152, the camera 121, and the first user input unit 210 may be located at the first body, 200, specifically, on the first front case 220 of the first body 200.

The display unit 151 may be a liquid crystal display (LCD) or an organic light emitting diode (OLED) display. A touch pad may be overlaid on the display unit 151 in a layered manner, so the display unit 151 may be operated as a touch screen to allow inputting of information by a user's touch.

The audio output unit 152 may be implemented in the form of a speaker or other sound producing device. The camera 121 may be implemented to be suitable for capturing images or video with respect to the user.

Like the first body 200, the case constituting the external appearance of the second body 205 may include a second front case 230 and a second rear case 235. A second user input unit 215 may be disposed at the second body, specifically, at a front face of the second body 205. A third user input unit 245, the microphone 122, and the interface unit 170 may be disposed on at least one of the second front case 230 and the second rear case 235.

The first to third user input units 210, 215 and 245 may be generally referred to as a manipulating portion 130, and various methods and techniques can be employed for the manipulation unit so long as they can be operated by the user in a tactile manner. For example, the user input units 130 can be implemented as dome switches, actuators, or touch pad regions that can receive user commands or information according to the user's touch operations (e.g., pressing, pushing, swiping, drag-and-drop) or may be implemented in the form of a rotatable control wheel (or disc), keys or buttons, a jog dial, or a joystick.

In terms of their functions, the first user input unit 210 is used for inputting (entering) commands such as start, end, or scroll, and the second user input unit 215 is used for inputting (entering) numbers, characters, or symbols. The first user input unit 210 may include a soft key used by interworking with icons displayed on the display unit 151 and a navigation key (largely including four direction keys and a central key) for indicating and checking directions. The third user input unit 245 may support the so-called hot key functions that allow more convenient activation of particular functions for the mobile terminal.

The microphone 122 (or other sound pick-up device) may be appropriately implemented to detect user voice inputs and other sounds.

The interface unit 170 may be used as a communication link (or passage, path) through which the terminal can exchange data with an external device. For example, the interface unit 170 may be implemented in the form of a connection port for connecting an earphone to the mobile terminal via a fixed or wireless means; a port for short-range communications such as an Infrared Data Association (IrDA) port, a Bluetooth® port, or a wireless LAN port; or power supply ports for providing power to the mobile terminal.

The interface unit 170 may be a card socket for accommodating a SIM (Subscriber Identification Module) card, a UIM (User Identity Module) card, or an external card such as a memory card for storing information.

The power supply unit 190 for supplying power to the terminal may be located at the second rear case 235. The power supply unit 190 may be, for example, a rechargeable battery that can be detached.

Figure 3:
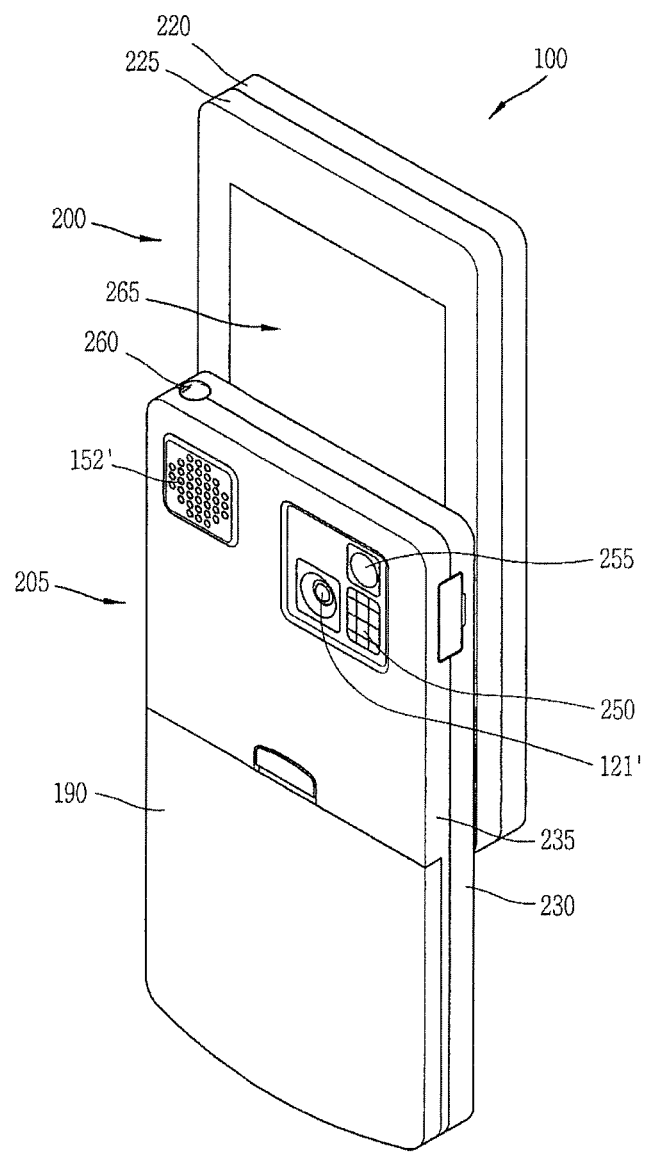
FIG. 3 is a rear perspective view of a mobile terminal for implementing an embodiment of the present invention.

FIG. 3 is a rear perspective view of the mobile terminal 100 of FIG. 2 according to an exemplary embodiment. As shown in FIG. 3, a camera 121' (or other image pick-up device) may additionally be disposed on a rear surface of the second rear case 235 of the second body 205. The camera 121' may have an image capture direction which is substantially opposite to that of the camera 121 (namely, the two cameras may be implemented to face towards opposing directions, such as front and rear), and may support a different number of pixels (i.e., have a different resolution) than the camera 121.

For example, the camera 121 may operate with a relatively lower resolution to capture an image(s) of the user's face and immediately transmit such image(s) to another party in real-time during video call communication in which reverse link bandwidth capabilities may be limited. The camera 121' may operate with a relatively higher resolution to capture images with high picture quality, which may not require immediately transmission in real-time, but may be stored for later viewing or use.

A flash 250 and a mirror 255 may be additionally disposed adjacent to the camera 121'. When an image of the subject is captured with the camera 121', the flash 250 illuminates the subject. The mirror 255 allows the user to see himself when he wants to capture his own image (i.e., self-image capturing) by using the camera 121'.

The second rear case 235 may further include an audio output module 152'. The audio output module 152' may support stereophonic sound functions in conjunction with the audio output module 152 and may be also used for sending and receiving calls in a speaker phone mode.

A broadcast signal receiving antenna 260 may be disposed (externally or internally) at one side or region of the second rear case 235, in addition to an antenna that is used for mobile communications. The antenna 260 can also be configured to be retractable from the second body 205.

One part of a slide module 265 that allows the first body 200 and the second body 205 to slide relative to each other may be disposed on the first rear case 225 of the first body 200. The other part of the slide module 265 may be disposed on the second front case 230 of the second body 205, which may not be exposed as shown in the drawing.

The second camera 121' and other components may be disposed on the second body 205, but such configuration is not meant to be limited. For example, one or more of the elements (e.g., 260, 121', 250, and 152'), which are disposed on the second rear case 235 may be mounted on the first body 200, mainly, on the first rear case 225. In this case, those elements disposed on the first rear case 225 can be protected (or covered) by the second body 205 in the closed configuration. In addition, even if a separate camera is not provided on the second body, the camera module 121 may be configured to rotate (or otherwise be moved) to thus allow image capturing in various directions.

The mobile terminal 100 as shown in FIG. 1, FIG. 2, and FIG. 3 may be configured to operate with a communication system, which transmits data via frames or packets, such as wired and wireless communication systems, as well as satellite-based communication systems.

Exemplary embodiments of the present invention provide a mobile terminal for expressing a set state of the font of currently executed input characters, and changing the set font by simply combining key buttons. In addition, exemplary embodiments of the present invention provide a mobile terminal for setting a desired emoticon (or special characters) or image as display characters of a keypad.

Figure 4:
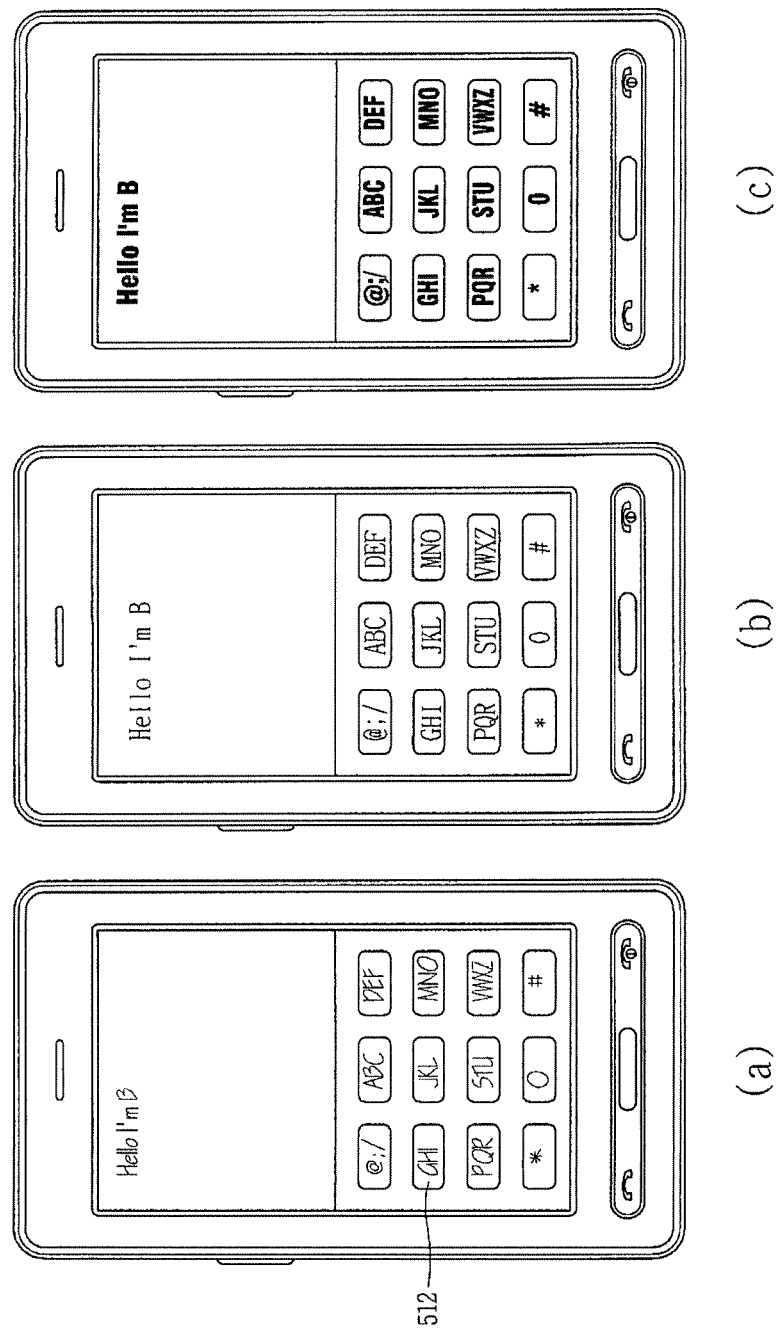
FIG. 4 is an exemplary view showing a first embodiment of the present invention.

FIG. 4 is an exemplary view showing a first embodiment of the present invention. In a keypad display method according to the first embodiment of the present invention, display characters 512 of the keypad are displayed in the same font as that of currently inputted characters. In the present invention, the font is defined as character attributes including the character size, color, style (e.g., italic, bold, underlined), and type (e.g., Arial, Times New Roman). The display characters are displayed on each key button of the key board or keypad, indicating key values of corresponding buttons. FIG. 4 illustrates keypads each having display characters of a different font.

Figure 5:
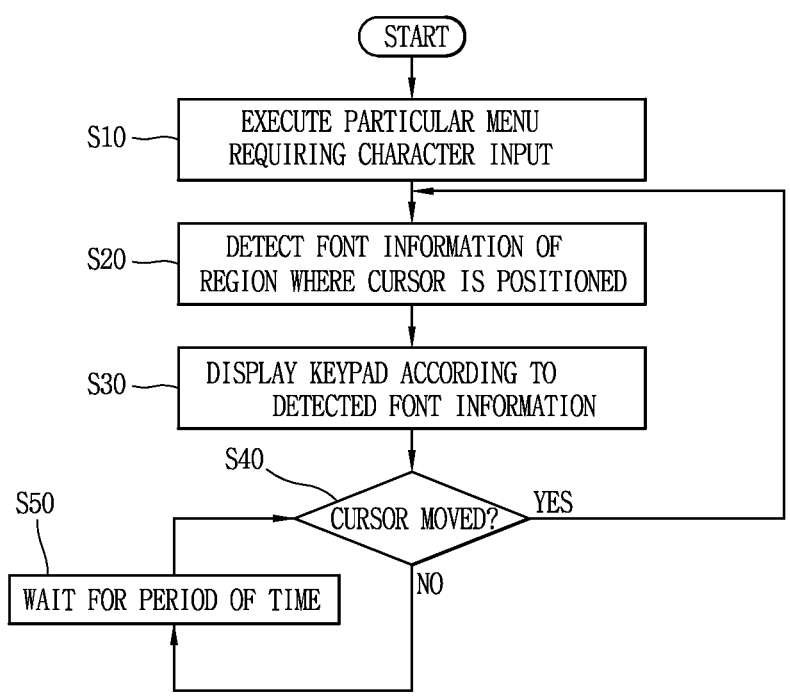
FIG. 5 is a flow chart illustrating a keypad display method according to the first embodiment of the present invention.
Figure 6:
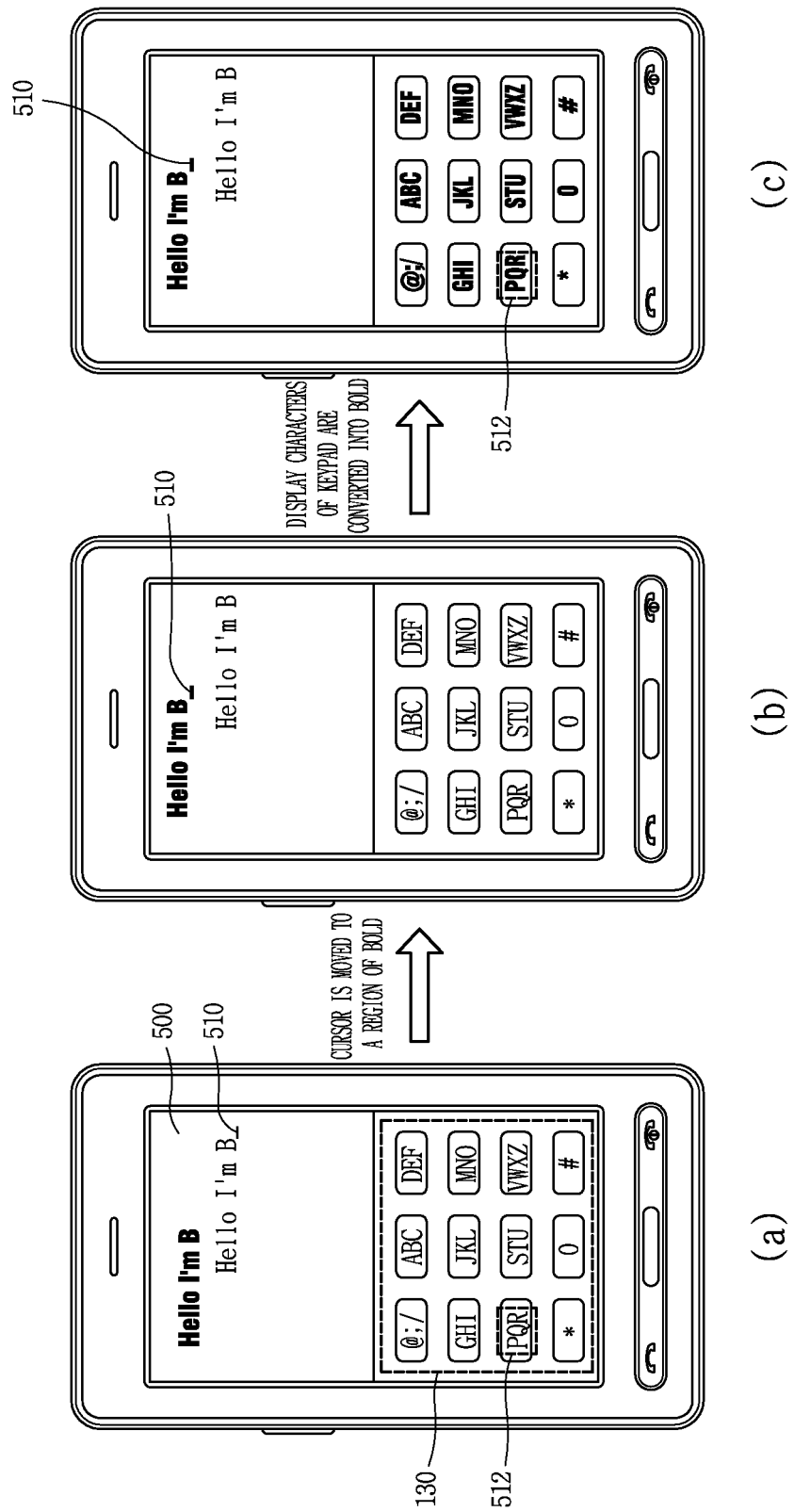
FIG. 6 is an exemplary view showing the keypad display method according to the first embodiment of the present invention.

FIG. 5 is a flow chart illustrating a keypad display method according to the first embodiment of the present invention. FIG. 6 is an exemplary view showing the keypad display method according to the first embodiment of the present invention.

When a particular menu requiring character input is executed (S10), the controller 180 displays the virtual keypad 130 as shown in FIG. 6. The controller 180 checks font information of a region of an editing window 500 where a character input cursor 510 (or prompt) is positioned (S20, S30).

After the controller 180 checks information about the font, a character size, color, style, and type of the region where the character input cursor is positioned, and reflects the information on the display characters 512 of the keypad. The display characters 512 of the keypad are displayed according to the font of the region where the cursor 510 is positioned (FIG. 6(a)). When editing a new document without text, the display characters 512 of the keypad are displayed according to basic font information of the terminal.

Thereafter, when the cursor 510 is moved according to a user input (S40), the controller 180 checks the font information of a region to which the cursor 510 has been moved, and if the checked font information is different from the font of the display characters 512 (FIG. 6(b)), the controller 180 reflects the font information of the current region on the display characters 512 of the keypad (FIG. 6(c)). If the cursor 510 has not moved, the controller 180 waits for a period of time (S50) before checking again whether the cursor has moved. The wait time in S50 may be set so that the display characters 512 are updated within a reasonable time after the cursor is moved to a region where the font is different.

Because the font information of the region where the cursor 510 is currently positioned is reflected on the display characters 512 of the keypad, the user can recognize the font of the characters or numbers that are being inputted via the display characters 512 of the keypad.

Figure 7:
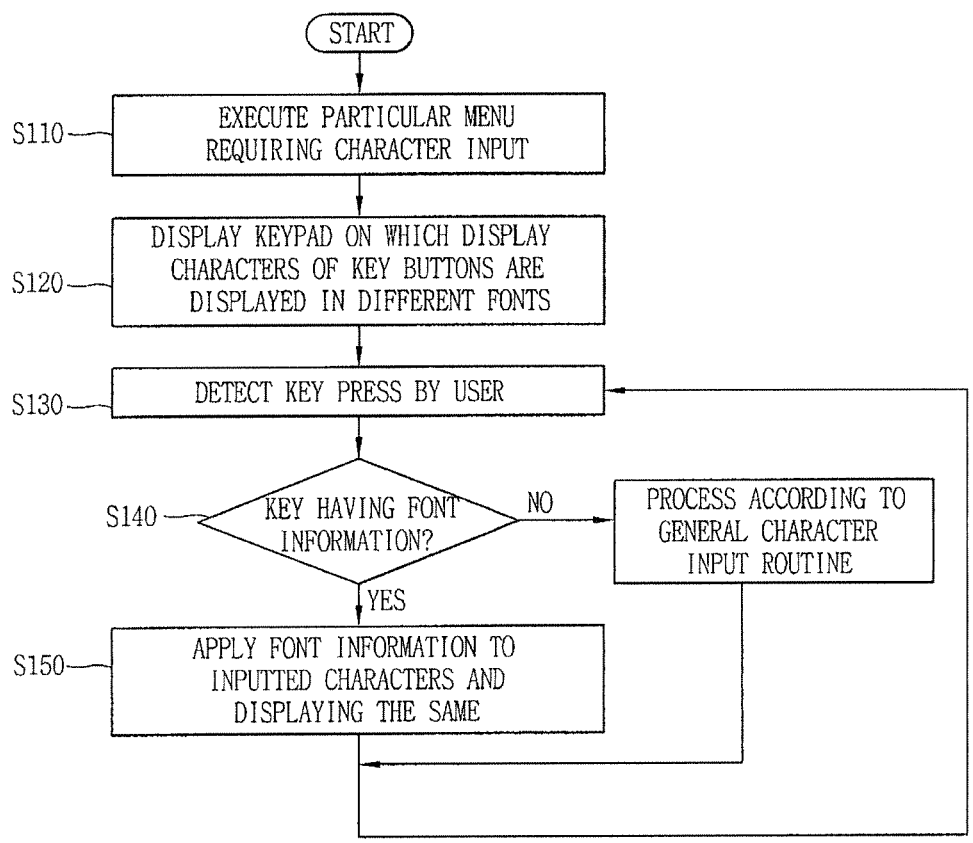
FIG. 7 is a flow chart illustrating a keypad display method according to a second embodiment of the present invention.
Figure 8:
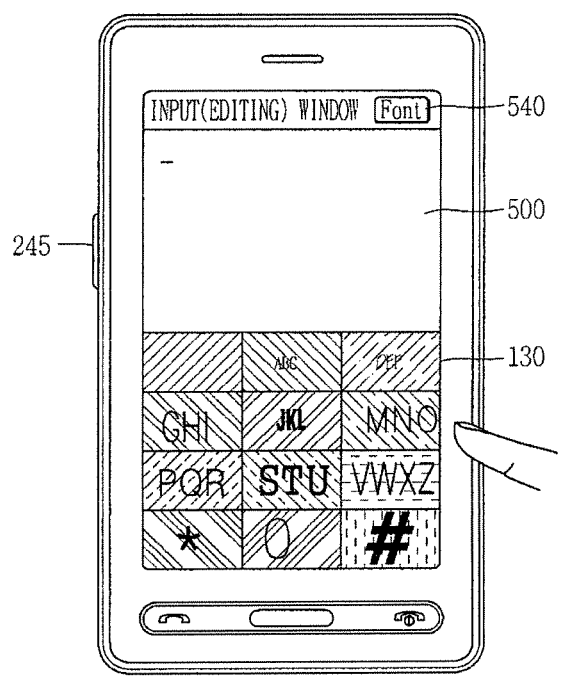
FIG. 8 is an exemplary view showing the keypad display method according to the second embodiment of the present invention.

FIG. 7 is a flow chart illustrating a keypad display method according to a second embodiment of the present invention. FIG. 8 is an exemplary view showing the keypad display method according to the second embodiment of the present invention.

In the keypad display method according to the second embodiment of the present invention, display characters of the respective key buttons are displayed in fonts that can be provided by the terminal. The display characters of the keypad are displayed in different fonts.

Once a particular menu requiring character input is executed (S110), the controller 180 displays an editing window 500 and the keypad having display characters each in different fonts as shown in FIG. 8 (S120).

With the editing window 500 and the keypad 130 appearing on the screen, when the user selects a particular key button, the controller 180 applies a font (character attribute) of the selected key button to a character (or number) input by the user. A combining key (e.g., combining of a function key and a character key) may be used to discriminate a key input for setting a font from that for a character input.

For example, when providing a key input for setting a font, the user may first input a particular key (e.g., a function key 245 or 540) and then input a key (one of the keys of the keypad 130) having a desired font. Alternatively, the function key 245 or 540 and the desired key (one of the keys of the keypad 130) may be simultaneously inputted to determine the font of a character to be input.

Once the key having font information (e.g., bold font, 10 points in size, and black color) is inputted, the controller 180 applies the input font information (e.g., bold, 10 points, black) to the character (or number) inputted by the user (S130 to S150).

In an exemplary embodiment of the present invention, the first and second embodiments may be combined and utilized together. In the embodiment, the display characters in the keypad are displayed according to the font of the character immediately preceding the cursor in the input window. When the function key 540 is pressed, the display characters are displayed in different fonts for user selection. Once a user selects a particular font, the display characters are displayed in the font selected.

Figure 9:
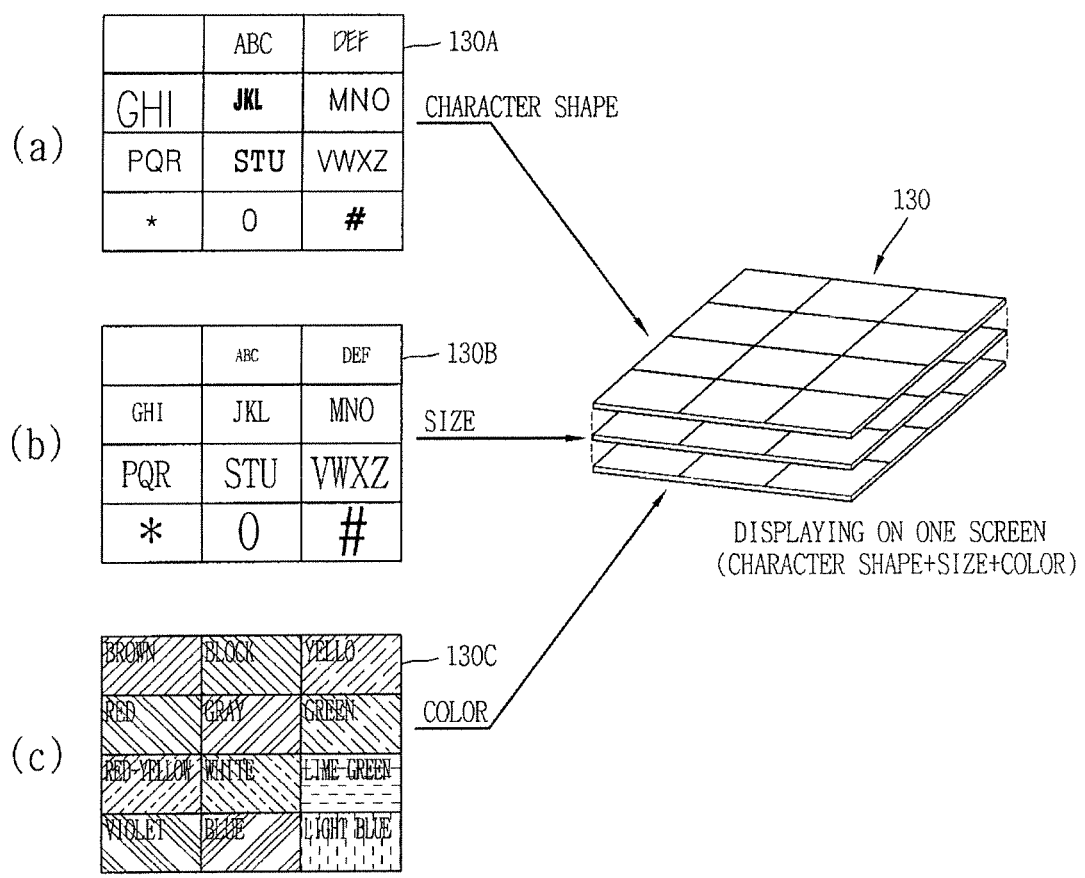
FIG. 9 is a view showing a configuration of the keypad according to the second embodiment of the present invention.

FIG. 9 is a view showing a configuration of the keypad 130 according to the second embodiment of the present invention. As shown in FIG. 9, the keypad 130 according to the second embodiment of the present invention has a configuration including a keypad 130A for setting a font, a keypad 130B for setting a character size, and a keypad 130C for setting a character color.

Figure 10:
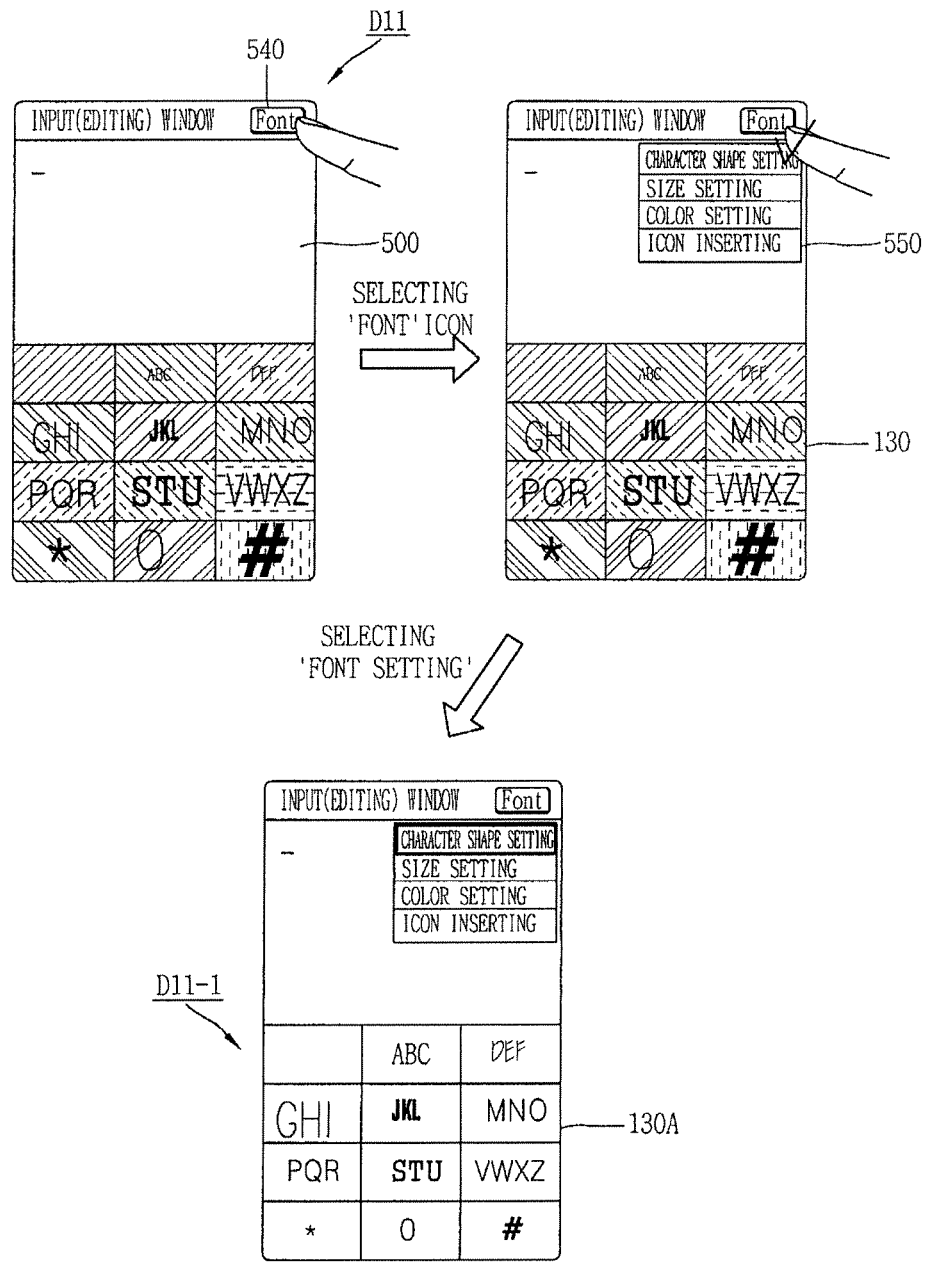
FIG. 10, FIG. 11, and FIG. 12 are exemplary views showing different examples of embodiments of FIG. 7.

FIG. 10 shows another embodiment of FIG. 7 in which the user sets a font. When a particular menu requiring character input is executed, the controller 180 displays the editing window 500 and the keypad 130 as shown in a screen (D11) of FIG. 10. The user may select (or touch) a certain software key, such as function key 540, to change the font of the editing window 500. Upon the function key 540 being touched, the controller 180 displays a font setting window 550 and the user may select a desired font setting such as character shape, size, or color. When the "character shape setting" is selected from among the font settings, the controller 180 changes the keypad 130 to "character shape setting mode" as shown in a screen D11-1 in FIG. 10. When a key (e.g., bold) having font information of the "font setting" is input, the controller applies the bold to characters (numbers) input by the user.

Figure 11:
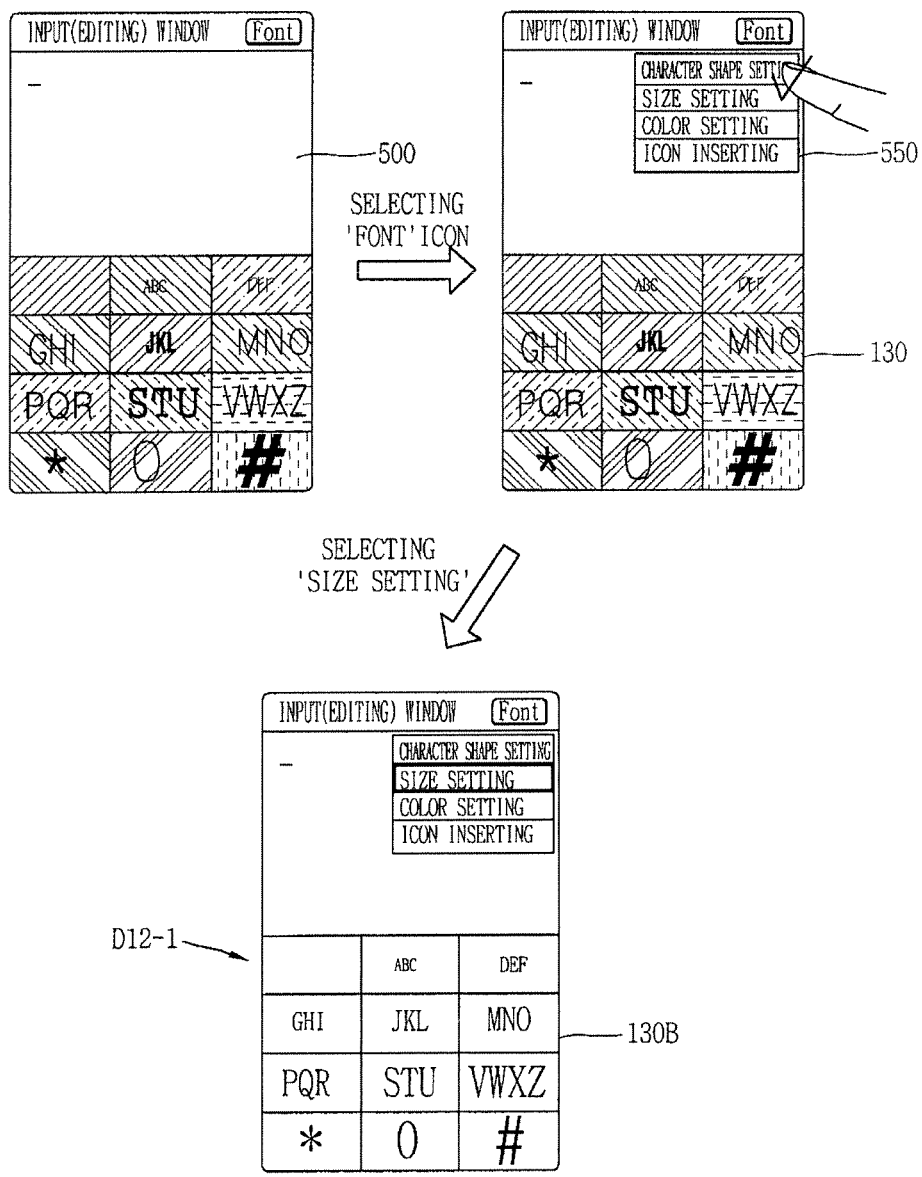
Figure 12:
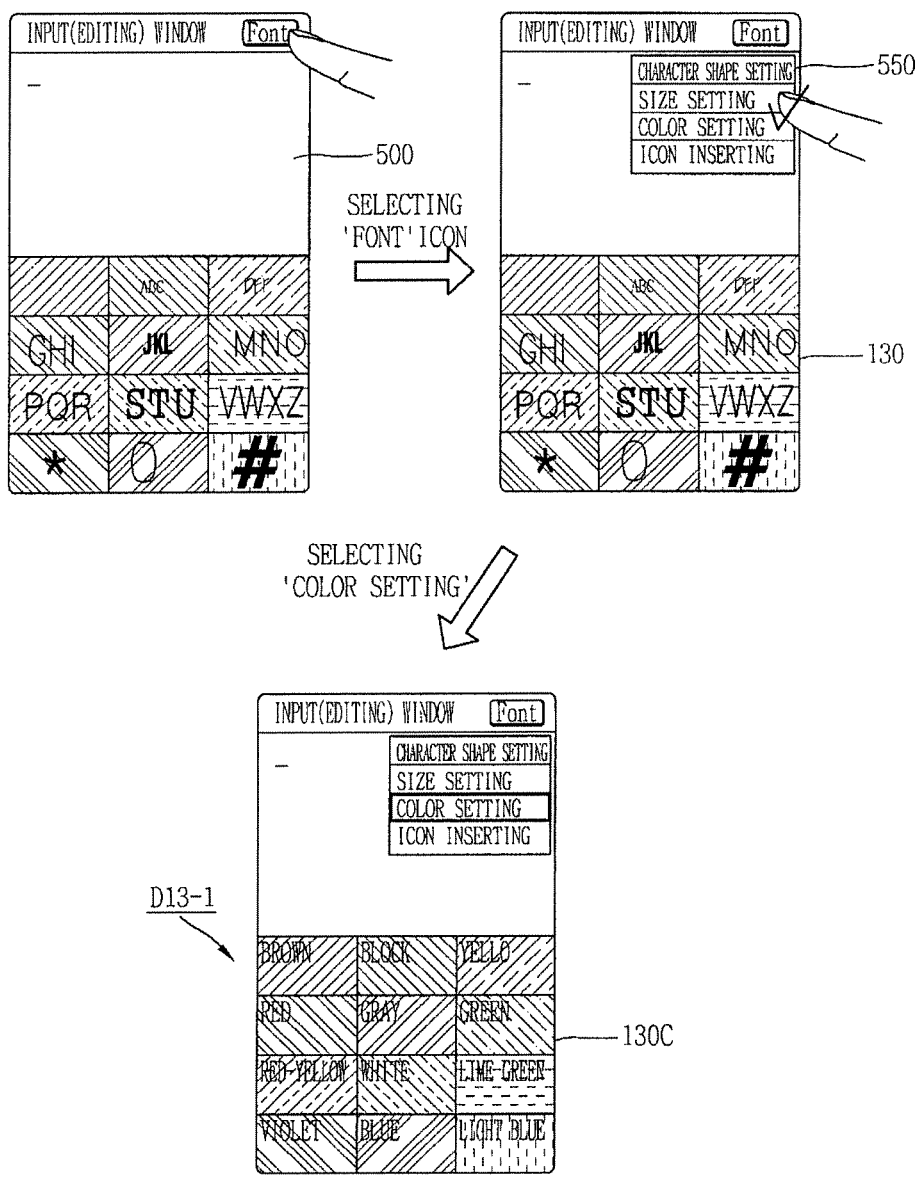

FIG. 11 and FIG. 12 are modifications of the embodiment of FIG. 7. Specifically, FIG. 11 shows an example of setting a font size by the user and FIG. 12 shows an example of setting a font color. In FIG. 11, the controller 180 displays the keypad 130B for setting the font size as shown in D12-1. In FIG. 12, the controller 180 displays the keypad 130C for setting the font color as shown in D13-1.

Figure 13:
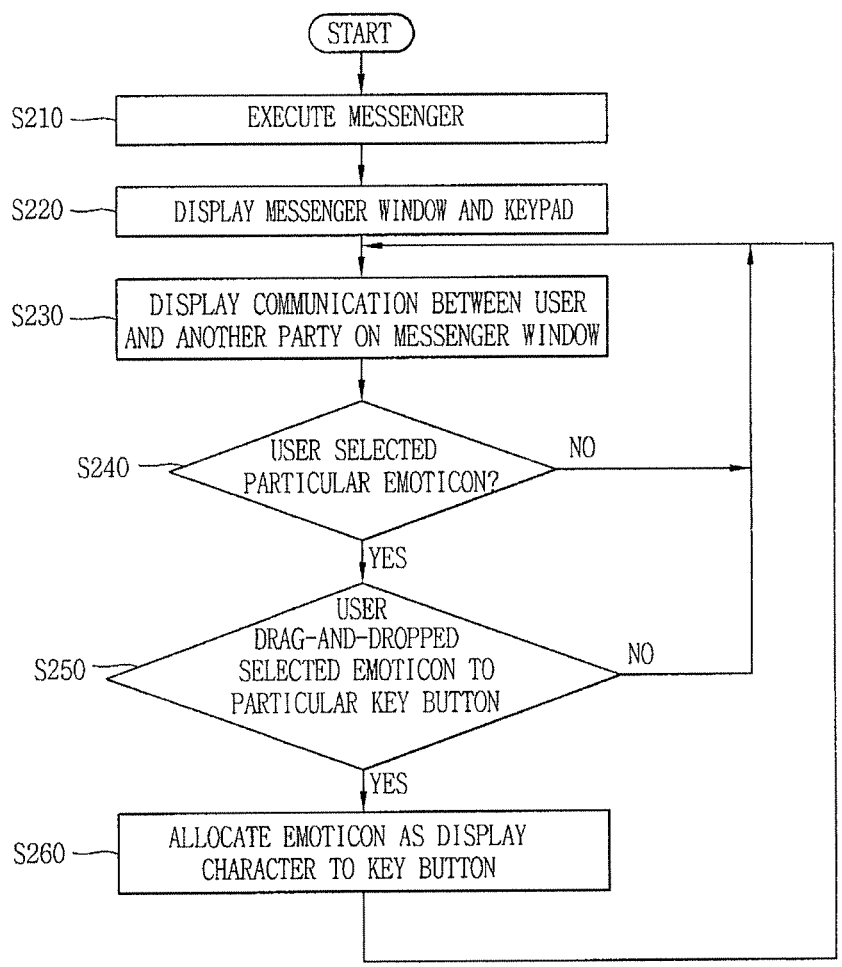
FIG. 13 is a flow chart illustrating a keypad display method according to a third embodiment of the present invention.
Figure 14:
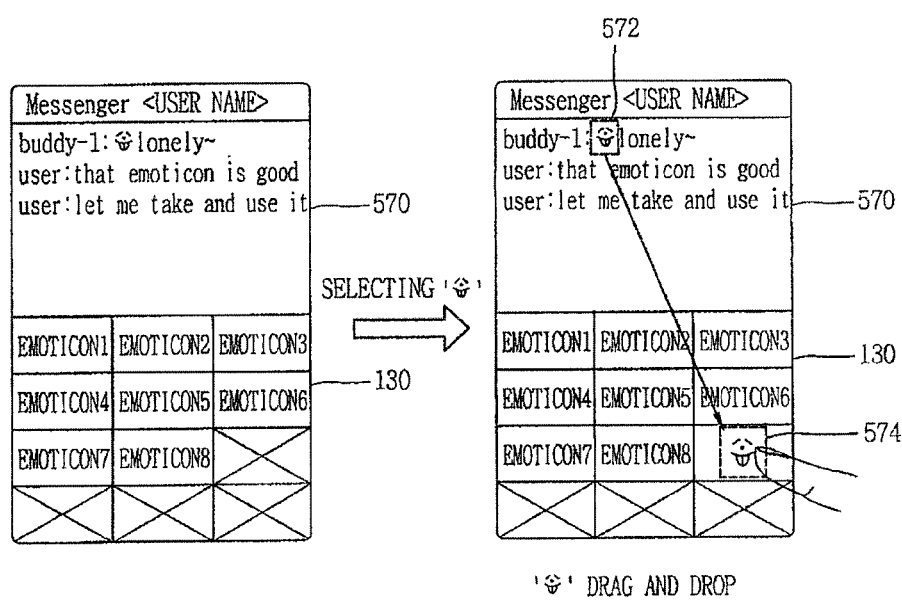
FIG. 14 is an exemplary view showing the keypad display method according to the third embodiment of the present invention.

FIG. 13 is a flow chart illustrating a keypad display method according to a third embodiment of the present invention. FIG. 14 is an exemplary view showing the keypad display method according to the third embodiment of the present invention.

The keypad display method according to the third embodiment of the present invention is to allocate a particular image, emoticon, special character, graphic, icon, symbol, hyperlink, avatar, or other graphical representation displayed on a Web page or a messenger window to the display characters of the keypad through a simple touch input. In this embodiment, it is assumed that a messenger is executed. The above identified graphical representation includes, among others, any of the characters identified by the International Organization for Standardization (ISO) and International Electrotechnical Commission (IEC) and compiled in the ISO/IEC 8859, which includes special characters, letters with diacritical marks (accents, umlauts, etc.), and scientific and currency symbols.

When a messenger is executed for communication with a different subscriber (S210), the controller 180 displays the messenger window 570 and the keypad 130 as shown in FIG. 14 (S220). The user may communicate via the messenger window 570 and the keypad 130.

While the user communicates with another party, various characters and images, such as a particular character or an emoticon, are displayed in the messenger window 570 (S230). In the present invention, the user can store a desired one of the displayed particular image or the special characters (or emoticon) as a display character on the keypad.

For example, when the emoticon 572 appears on the messenger window 570, if the user touches and moves (e.g., drag and drops) the corresponding emoticon to a particular key button 574 (S240, S250), the controller 180 detects the user's touch input and allocates the emoticon 572 as a display character of the key button 574 (S260). The allocated emoticon 572 is displayed as the display character on the key button. Thereafter, when the key button 574 is selected by the user, the controller 180 displays the emoticon 572 in the messenger window 570.

In the embodiments of the present invention, the above-described keypad display method can be implemented as codes that can be read by a computer in a program-recorded medium. The computer-readable medium may include any types of recording devices storing data that can be read by a computer system.

The computer-readable medium includes various types of recording devices in which data read by a computer system is stored. The computer-readable medium may include a ROM, a RAM, a CD-ROM, a magnetic tape, a floppy disk, an optical data storage device, and the like. The computer-readable medium also includes implementations in the form of carrier waves or signals (e.g., transmission via the Internet). The computer may include the controller 180 of the mobile terminal.

Embodiments of the present invention provide a keypad for displaying a state of the font of inputted characters and provide for changing the font by combining key buttons. In addition, the keypad may be implemented such that a desired emoticon (or special characters) or image is set as one of the display characters to facilitate the inputting of characters, letters, numbers, punctuation, symbols, and other graphics.

While the invention has been described in terms of exemplary embodiments, it is to be understood that the words which have been used are words of description and not of limitation. As is understood by persons of ordinary skill in the art, a variety of modifications can be made without departing from the scope of the invention defined by the following claims, which should be given their fullest, fair scope.

What is claimed is:

1. A keypad display method of a mobile terminal, the method comprising:
   executing a message application;
   displaying a display window associated with the executed message application;
   displaying a virtual keypad including a plurality of character keys while the message application is executed such that the display window and the virtual keypad are displayed together, wherein the plurality of character keys are displayed in a plurality of fonts;
   setting a font of at least one input character to be entered and displayed in the display window based on a font of a particular character key of the plurality of character keys in response to user selection of the particular character key;
   displaying data externally received via the message application in the display window such that the virtual keypad is displayed together with the externally received data while the message application is executed, the externally received data including at least one user-selectable emoticon that is movable;
   allocating a user-selectable emoticon of the at least one user-selectable emoticon directly to a specific character key selected among the plurality of character keys displayed while the message application is executed when the user-selectable emoticon is touched and moved from the externally received data to the specific character key of the virtual keypad such that the allocated emoticon is included in the selected specific character key of the displayed virtual keypad in response to the touching and moving of the user-selectable emoticon while the externally received data is displayed in the display window; and
   displaying the user-selectable emoticon on the display window in response to an input via the character key.

2. The method of claim 1, wherein the displaying the virtual keypad comprises:
   displaying a user-selectable function key; and
   displaying the plurality of character keys in the plurality of fonts upon user selection of the user-selectable function key.

3. The method of claim 1, wherein the displaying the virtual keypad comprises:
   displaying a user-selectable function key;
   displaying a selection window for selecting font options upon user selection of the user-selectable function key, the font options including a font type option, a font size option, and a font color option; and
   displaying the plurality of character keys in the plurality of fonts upon user selection of the font options.

4. A mobile terminal comprising:
   a display; and
   a controller configured to:
      execute a message application;
      cause the display to display a display window associated with the executed message application and a virtual keypad together at the display while the message application is executed, wherein the virtual keypad includes a plurality of character keys, and wherein the plurality of character keys are displayed in a plurality of fonts;
      set a font of at least one input character to be entered and displayed in the display window based on a font of a particular character key of the plurality of character keys in response to user selection of the particular character key;
      cause the display to display data externally received via the message application in the display window such that the virtual keypad is displayed together with the externally received data while the message application is executed, the externally received data including at least one user-selectable emoticon that is movable;
allocate a user-selectable emoticon of the at least one user-selectable emoticon directly to a character key selected among the plurality of character keys displayed while the message application is executed when the user-selectable emoticon is touched and moved from the externally received data to the specific character key of the virtual keypad such that the allocated emoticon is included in the selected specific character key of the displayed virtual keypad in response to the touching and moving of the user-selectable emoticon while the externally received data is displayed in the display window; and
cause the display to display the user-selectable emoticon on the display window in response to an input via the character key.

5. The mobile terminal of claim 4, wherein the controller is further configured to cause the display to display a user-selectable function key and to display the plurality of character keys in the plurality of fonts upon user selection of the user-selectable function key.

6. The mobile terminal of claim 4, wherein the controller is further configured to cause the display to:
display a user-selectable function key;
display a selection window for selecting font options upon user selection of the user-selectable function key, the font options including a font type option, a font size option, and a font color option; and
display the plurality of character keys in the plurality of fonts upon user selection of the font options.

7. A keypad display method of a mobile terminal, the method comprising:
executing a message application;
displaying a display window associated with the executed message application and a virtual keypad together at a display unit of the mobile terminal while the message application is executed, wherein the virtual keypad comprises a plurality of character keys, wherein a font of the plurality of keys is assigned with a font of a first input character displayed adjacent to a cursor positioned in the display window;
changing the font of the plurality of character keys with a font of a second input character displayed adjacent to the cursor in the display window when the cursor is moved in response to a touch input;
displaying a user-selectable function key;
displaying the plurality of character keys in the plurality of fonts upon user selection of the user-selectable function key;
setting a font of at least one input character to be entered and displayed in the display window based on a font of a particular character key of the plurality of character keys in response to user selection of the particular character key;
displaying data externally received via the message application in the display window such that the virtual keypad is displayed together with the externally received data while the message application is executed, the externally received data including at least one user-selectable emoticon that is movable;
allocating a user-selectable emoticon of the at least one user-selectable emoticon directly to a specific character key selected among the plurality of character keys displayed while the message application is executed when the user-selectable emoticon is touched and moved from the externally received data to the specific character key of the virtual keypad such that the allocated emoticon is included in the selected specific character key of the displayed virtual keypad in response to the touching and moving of the user-selectable emoticon while the externally received data is displayed in the display window; and
displaying the user-selectable emoticon on the display window in response to an input via the character key.

8. A mobile terminal comprising:
a display; and
a controller configured to:
execute a message application;
cause the display to display a display window associated with the executed message application and a virtual keypad together at the display while the message application is executed;
cause the display to display input characters and a cursor in the display window, wherein the virtual keypad comprises a plurality of character keys, and wherein a font of the plurality of character keys is assigned with a font of a first input character displayed adjacent to the cursor;
change the font of the plurality of character keys with a font of a second input character displayed adjacent to the cursor in the display window when the cursor is moved in response to a touch input;
cause the display to display a user-selectable function key;
cause the display to display the plurality of character keys in the plurality of fonts upon user selection of the user-selectable function key;
set a font of at least one input character to be entered and displayed in the display window based on a font of a particular character key of the plurality of character keys in response to user selection of the particular character key;
cause the display to display data externally received via the message application in the display window such that the virtual keypad is displayed together with the externally received data while the message application is executed, the externally received data including at least one user-selectable emoticon that is movable;
allocate a user-selectable emoticon of the at least one user-selectable emoticon directly to a specific character key selected among the plurality of character keys displayed while the message application is executed when the user-selectable emoticon is touched and moved from the externally received data to the specific character key of the virtual keypad such that the allocated emoticon is included in the selected specific character key of the displayed virtual keypad in response to the touching and moving of the user-selectable emoticon while the externally received data is displayed in the display window; and
cause the display to display the user-selectable emoticon on the display window in response to an input via the character key.

* * * * *